Patented Apr. 22, 1941

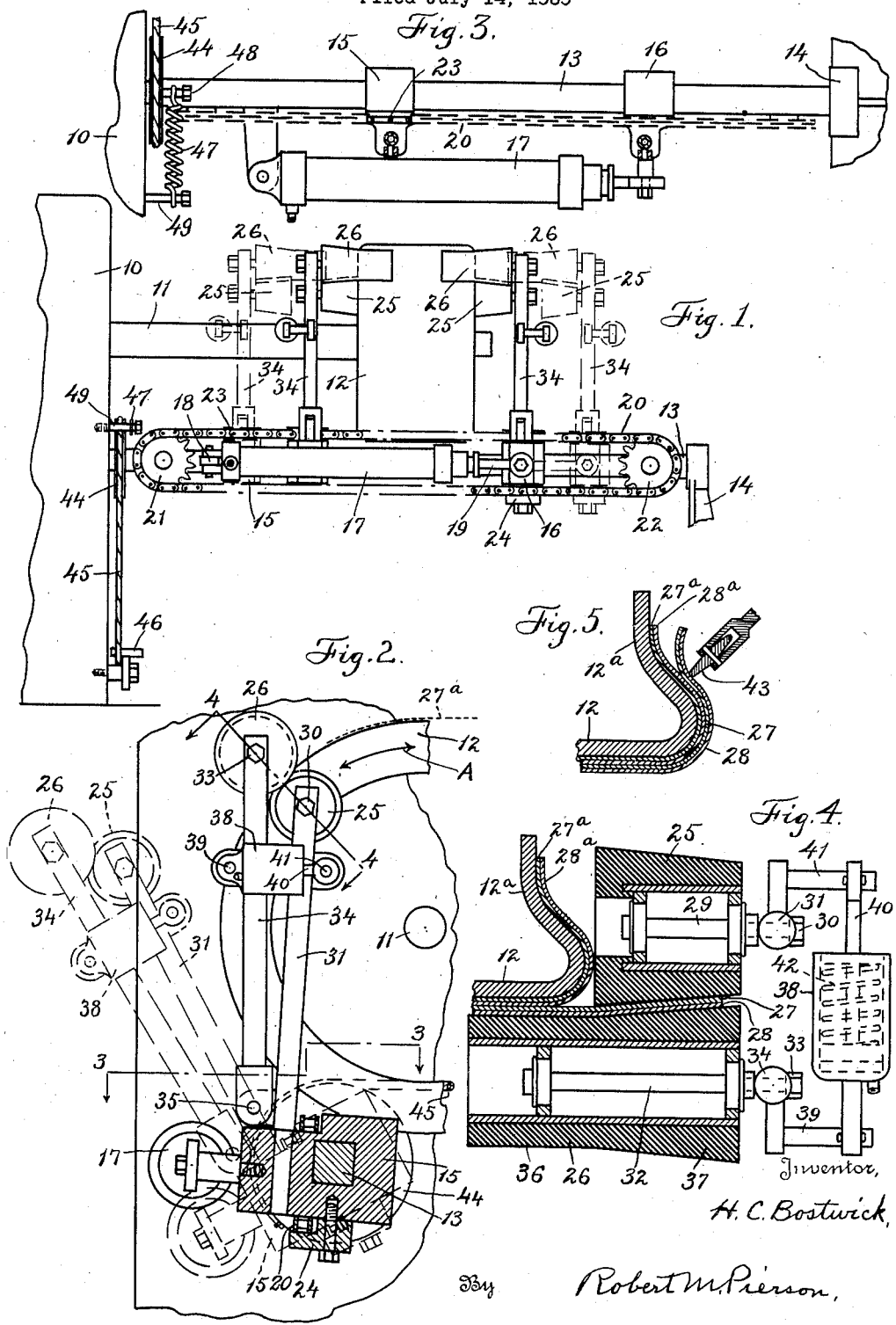

2,239,453

UNITED STATES PATENT OFFICE 2,239,453

TIRE BUILDING APPARATUS

Henry C. Bostwick, Coventry Township, Summit County, Ohio, assignor to Akron Standard Mold Company, Akron, Ohio, a corporation of Ohio Application July 14, 1939, Serial No. 284,476

8 Claims. (Cl. 154—10)

This invention, relating to the art of building pneumatic tires, has for its object to provide means for doubling or uniting, in such manner as to avoid substantial puckering, folding or creasing by subsequent stitching or rolling-down operations, the margins of rubberized cord-fabric strips which are applied by wrapping the fabric in successive laminations progressively upon the tire-building form.

It is already known that a 2-ply band of rubberized cord tire fabric, having bias threads laid oppositely or across each other in the respective plies, may be made up separately and applied by stretching and drawing it axially onto the form, and the margins of such a band will lie evenly around the shoulder of the form when rolled down by the stitching tools. But the application of such a band to the form is a difficult and laborious operation and considerable distortion occurs in placing the band as compared with the method of winding the plies progressively upon the form. The present invention provides an efficient method of doubling plies which are progressively wound upon the form, and an improved apparatus for producing adhesion of the free ply margins before rolling them down.

Of the accompanying drawing,

Fig. 1 is a partial rear elevation of a tire-building machine constructed according to my invention and adapted to carry out the ply doubling and adhering steps thereof.

Fig. 2 is a partial end elevation, partly in section.

Fig. 3 is a partial plan view on a reduced scale, in section on the line 3—3 of Fig. 2.

Fig. 4 is a section on the line 4—4 of Fig. 2 on a larger scale, showing the operation of the doubling rollers upon the work.

Fig. 5 is a detail transverse section showing the operation of stitching down the doubled plies.

In the drawing, 10 is one end of a tire-machine casing from which projects a horizontal rotary power shaft 11 carrying at its outer end the usual collapsible tire-building drum or form 12 rotatable in either direction during ply winding as indicated by the double-ended arrow A in Fig. 2.

At the back of the machine, parallel with the drum shaft, a rock-shaft 13 of square section has its ends journaled in bearings respectively on the casing 10 and a floor bracket 14. On this shaft are mounted to slide in opposite directions a pair of carriages 15, 16 for supporting the pairs of ply-doubling roller tools hereinafter referred to, said carriages being moved by a fluid-pressure ram 17 having the inner end of its cylinder fixed at 18 on the square shaft 13 and its piston rod 19 attached to the outer carriage 16, together with a chain 20 running over a pair of idle sprockets 21, 22 and having its upper stretch attached at 23 to the inner carriage 15, while its lower stretch is adjustably fixed by a clamp 24 to the outer carriage 16.

On each of the carriages 15, 16 at opposite ends of the drum 12 is mounted a pair of ply doubling and adhering rollers 25, 26, positioned to lie respectively on the inner side and the outer side of the free margins of pairs of rubberized cord-fabric plies 27, 28 which have been wound upon the drum 12 or upon an underlying pair of plies 27ᵃ, 28ᵃ previously applied to the drum.

The inner roller 25, which is carried by antifriction bearings upon a horizontal shaft 29 bolted at 30 on the upper end of a supporting rod 31 whose lower end is fixed in the corresponding carriage 15 or 16, is mounted opposite the shoulder and bead-seating flange 12ᵃ of the drum 12 and provided with a conical resilient rubber body tapering axially outward or away from the drum.

The outer roller 26 is similarly carried by antifriction bearings on a horizontal shaft 32 bolted at 33 to the upper end of a supporting rod 34 whose lower end is pivoted at 35 on a bracket secured to the rod 31. Said roller 26 also has a soft rubber body with a cylindrical inner portion 36 overlying the marginal cylindrical body of the drum 12, in driven engagement with the outermost carcass ply 28, and an outer portion 37 opposite the roller 26, tapered oppositely to the latter and coacting therewith upon the free margins of the plies 27, 28.

Between the roller-supporting rods 31 and 34 is interposed a single-acting fluid-pressure ram 38 having its cylinder pivoted at 39 on a bracket fixed upon the rod 34 and its piston rod 40 pivoted at 41 upon a bracket fixed to the rod 31, for separating the rollers 25, 26 to admit the free edges of the carcass plies between them, the separation of the rollers being effected by the fluid pressure and their return against the ply margins by means of an internal spring 42. The previously described ram 17 may act in a similar manner to separate and return the carriages 15, 16.

The purpose of the opposite tapering of the rollers 25, 26, according to which the surface speed of the conical part 37 of roller 26 exceeds that of its cylindrical portion 36, is to exert an outward and forward drawing or wiping action on the fabric margins which helps to lay the plies smoothly against each other during the doubling operation and permits the doubled margins to be smoothly stitched or rolled down around the shoulder of the drum and against its bead-seating flange 12ᵃ, by the subsequent action of a roller stitcher 43 shown in Fig. 5, either mounted and guided on the machine or held in the hand of the tire builder.

To bring the pairs of doubling rollers 25, 26 from a normally retracted position shown in broken lines in Fig. 2 to the operative position shown in full lines, the square rockshaft 13 is provided at its inner end with a pulley 44 attached to one end of a cord 45 whose opposite end connects with a treadle lever 46, shown in Fig. 1, extending forward to the front of the machine within reach of the operator's foot, together with a pull spring 47 having opposite ends attached respectively to an eccentric pin 48 on the pulley 44 and a fixed pin 49 on the machine casing 10, whereby the rollers and their supports are returned to the broken-line inoperative position of Fig. 2 upon release of the pedal pressure.

In using the described apparatus, the leading edge of a strip of bias rubberized cord fabric, which is to become the innermost carcass ply 27ª, is applied to and wound upon the tire-building drum 12, and a second ply 28ª with bias threads laid opposite to the first one, is then wound in similar manner upon the drum, over the first ply. This inner pair of plies preferably then has its free margins adhered or united, after the manner to be described in connection with the second pair of plies, before the doubled margins are rolled or stitched against the bead-seating flanges of the drum, although it would be possible to place a 2-ply band over the drum and stitch down its margins in the usual manner.

After applying the inner plies 27ª, 28ª and shaping their margins against the drum, the next pair of plies 27, 28, which would be the outermost pair in a 4-ply tire, is wrapped in succession upon the inner pair of plies. To double and unite the margins of the outer plies 27, 28, while they are free or unattached to the underlying fabric, the pairs of rollers 25, 26 which, in their inoperative position, are separated to a distance wider than the fabric strip, by spreading the carriages 15, 16 with the aid of the fluid pressure ram 17, are also radially separated by the action of the ram 38 to admit between them the doubled margins of the plies 27, 28 and are then moved forward from the broken-line inoperative position of Fig. 2 into the full-line operative position, by the operator stepping on the treadle lever 46 to rock the square shaft 13 in a forward direction. The carriages 15, 16 are returned endwise of the drum to bring the pairs of rollers 25, 26 into operative position relative thereto as indicated by the full lines in Figs. 1, 2 and 4, said rollers are closed together upon the ply margins through the action of the ram 38, and while the operator's foot is still on the treadle lever, the drum is rotated to wind on the fabric. The pressure of the rollers 25, 26 firmly unites the free ply margins at both ends of the drum during one or more rotations of the latter and their wiping action upon the fabric, due to the opposite taper and difference of roller diameters, aids in smoothing the ply margins as previously indicated. The rollers 25, 26 are then radially separated through the action of the ram 38, the pairs spread apart endwise through the action of ram 17, and the pairs angularly retracted with the rock-shaft 13, by the action of the spring 47, in a reversal of the previously described roller positioning operations. The doubled free margins of the plies 27, 28 are then ready for the final step of rolling or stitching them down over the shoulders and bead flanges of the drum, in a spinning action by means of the stitching roller 43, as indicated in Fig. 5, during rapid rotation of the drum. In this final step, the doubled ply margins behave as a unit, after the manner of square-woven rubberized fabric, to lie smoothly against the drum flanges and underlying fabric plies thereon. The margin-doubling and stitching operations are repeated on subsequent pairs of plies when there are more than four plies in the tire carcass.

The invention is applicable to various forms of tire-building machines, and its form of embodiment may be varied within the scope of the appended claims.

I claim:

1. A tire building apparatus, comprising a rotary form and a pair of coacting fabric-pressing rollers, one located adjacent the edge of the form as a continuation of the surface thereof and extending radially within the surface of the form, the other operatively located generally outward of the first roller for uniting the free margins of a pair of plies while they are in position about the form.

2. An apparatus according to claim 1 wherein the rotary form has within it adjacent an edge an inwardly-extending bead-seating member into which the fabric may be bent.

3. An apparatus according to claim 1 wherein the second roller extends also across a portion of the surface of the rotary form and coacts both with such form and with the first-mentioned roller.

4. Apparatus according to claim 1 in which the roller surfaces are of yielding material.

5. Apparatus according to claim 1 in which the rollers are oppositely tapered.

6. Apparatus according to claim 1 in which the outer roller has a substantially cylindrical portion operatively overlying the form and a substantially conical overhanging portion with its larger end remote from said cylindrical portion and the inner roller is complementally conical and tapered away from the form.

7. Tire-building apparatus comprising a rotary form having an inwardly-extending bead-seating end flange, a pair of coacting rollers having soft-rubber fabric pressing surfaces, one operatively located opposite said end flange, of conical shape and tapered away from the form, the other being operatively located radially outward of the first roller, of conical shape and tapered oppositely to said first roller, said outer roller having a substantially cylindrical extension operatively overlying the form in driven engagement with the latter or with the fabric thereon, and means for separating said rollers and shifting them endwise in relation to the form to admit between them or release the free margins of a pair of fabric plies on the form.

8. Tire-building apparatus comprising a rotary form having a substantially cylindrical middle body and a pair of inwardly-extending bead-seating end flanges, two pairs of respectively inner and outer, coacting, fabric-pressing rollers with their nip operatively positioned in line with opposite ends of the cylindrical form body, and the outer rollers in driven relation to the form, means for separating the members of each pair to admit between them the free margins of a pair of fabric plies on the form, means for oppositely shifting the pairs of rollers endwise of the form, and means for retracting and projecting the pairs substantially radially of the form.

HENRY C. BOSTWICK.